July 7, 1970 E. T. HATLEY 3,519,760

MAGNETIC DUPLICATING APPARATUS USING A MULTIPLE GAP D.C. HEAD

Original Filed Dec. 30, 1966 2 Sheets-Sheet 1

INVENTOR
E. TROY HATLEY

BY John H. Holcombe

ATTORNEY

July 7, 1970 E. T. HATLEY 3,519,760

MAGNETIC DUPLICATING APPARATUS USING A MULTIPLE GAP D.C. HEAD

Original Filed Dec. 30, 1966 2 Sheets-Sheet 2

United States Patent Office 3,519,760
Patented July 7, 1970

3,519,760

MAGNETIC DUPLICATING APPARATUS USING A MULTIPLE GAP D.C. HEAD

Elbert Troy Hatley, San Jose, Calif., assignor to International Business Machines Corporation, Armonk, N.Y., a corporation of New York

Continuation of application Ser. No. 606,173, Dec. 30, 1966. This application Sept. 25, 1969, Ser. No. 861,204
Int. Cl. G11b *5/86*
U.S. Cl. 179—100.2 10 Claims

ABSTRACT OF THE DISCLOSURE

Apparatus for duplicating a magnetic recording previously recorded on a high coercivity master magnetic tape. The master tape is placed in face to face contact with a copy of lower coercivity in the presence of a magnetic field. The field is provided by a multiple gap D.C. head energized such that adjacent poles are of opposite polarity. Master and copy tapes are drawn across the D.C. head such that each element of the tapes is subjected to a number of cycles of polarity reversal, duplicating the magnetic recording on the copy tape. As the tapes are withdrawn from the D.C. head, they are immediately separated to prevent degradation of the duplicated copy.

This is a continuation of application Ser. No. 606,173, filed Dec. 30, 1966, and now abandoned.

BACKGROUND OF THE INVENTION

Field of the invention

The invention relates to magnetic duplicating apparatus, and more particularly to apparatus for duplicating magnetic records by transferring a magnetic pattern from a master magnetic record medium to a magnetizable copy medium.

Description of the prior art

Prior art magnetic duplicating apparatus employs means to bring a master magnetic record of high coercivity into face to face contact with a magnetizable copy record of lower coercivity in the presence of a magnetic bias field. The field is generally created by a magnetic core having a gap across which the master and copy tapes are drawn in intimate face-to-face contact. One other system utilizes a large magnetic core having a gap through which the master and copy tapes are drawn while in contact. Another system utilizes a magnetic coil or solenoid wherein the master and copy records are brought into contact inside the coil.

In each of these systems, the cores or coils are energized by means of an alternating electrical current to provide an alternating field through which the tapes are drawn. In some instances it is suggested that a direct current source may be substituted for the alternating current source.

The bias fields energized by a direct current source have not proven as effective as alternating current fields and, hence, the alternating current field has been almost exclusively employed. The alternating current systems, however, are severely limited with respect to the speed of operation for effective transfer to occur. The magnetic bias field must extend approximately evenly across the entire width of both tapes. Therefore, the cores or coils have relatively large physical size. The frequency at which such cores or coils can be driven at effective power levels is therefore severely limited. Since the frequency of operation is limited, the speed at which the tapes can be moved through the alternating field is also limited. The speed limitation comes into effect because, for effective transfer, each element of contact area between the master and copy tapes must be cycled through several cycles of the alternating magnetic field. Hence, the time required for transfer of data between long tapes is substantial.

Even at the higher ranges of presently usable transfer speeds, a high frequency of the alternating field becomes necessary to assure that several cycles of the field are experienced by each element of the contact area between the master and the copy tapes. Consequently, special and complex equipment is required to provide the signal power for the alternating magnetic bias head.

SUMMARY OF THE INVENTION

An object of the present invention is to provide means which is simplified in nature for achieving the efficiency of an alternating magnetic field which is speed or frequency independent.

The invention comprises apparatus for duplicating magnetic records by contact printing (magnetic transfer) with the improvement of a multiple gap magnetic head driven by a D.C. source to provide a series of alternately poled magnetic fields along the length of the head. Means is provided for forcing the master and copy magnetic records into face-to-face contact in the presence of the bias field created by the head, to draw the magnetic records through the field while in contact, and to separate the records as they leave the field. In this manner, the magnetically recorded information on the high coercivity master magnetic record is duplicated on the copy magnetic record independently of the speed at which the tapes are drawn through the magnetic field since each element of contact area between the master and copy magnetic records experiences the same number of cycles of the magnetic field at any speed.

DESCRIPTION OF THE PREFERRED EMBODIMENT

Figure 1:
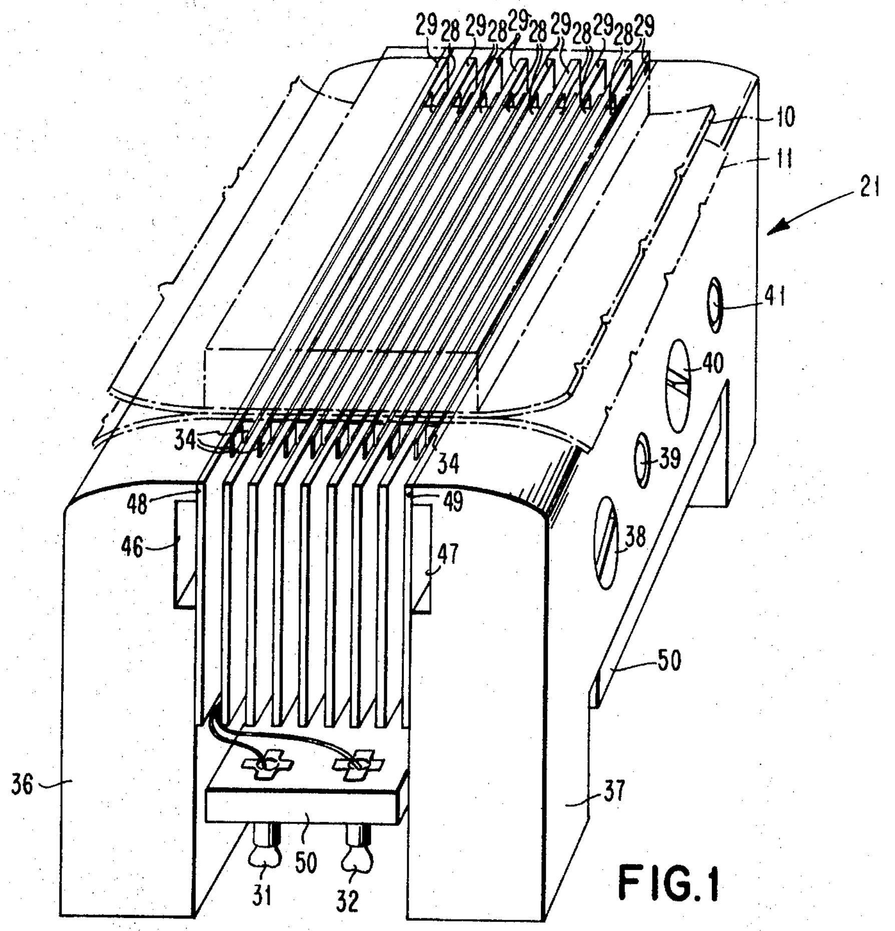
FIG. 1 is a perspective view of a magnetic transfer head constructed in accordance with the present invention.
Figure 2:
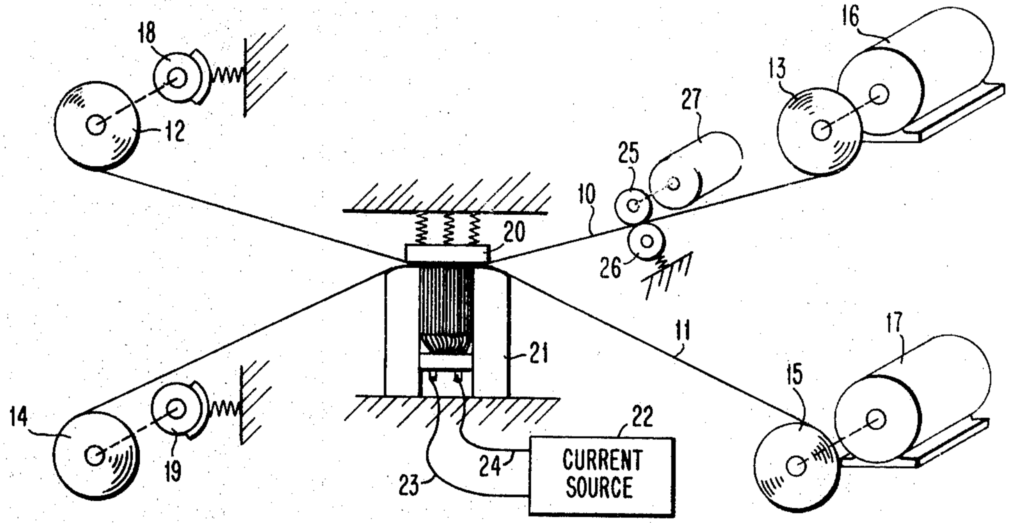
FIG. 2 comprises a schematic diagram of a magnetic transfer system constructed in accordance with the present invention.

Referring to FIGS. 1 and 2, magnetic duplicating apparatus is shown for causing a magnetic pattern recorded on a master magnetic record 10 to be transferred to a magnetizable copy medium 11. The master tape is of high coercivity, preferably over 500 oersted, and has been previously recorded with a magnetic pattern. The copy tape 11 is of lower coercivity, approximately 250 oersted, and is blank or has been erased. These tapes comprise a flat, thin backing made for example of Mylar, and are coated with iron oxide materials and a binder. Of course, other materials may be used but the above are conventional in the art. The sole limitation important here is the coercivities of the magnetic coating on the master and copy tapes.

Master tape 10 is spooled on supply reel 12 and takeup reel 13. Likewise, copy tape 11 is spooled on supply reel 14 and takeup reel 15. Takeup motors 16 and 17 drive takeup reels 13 and 15 to wind, respectively, master tape 10 and copy tape 11 thereon. Both tapes are kept under tension by means of brakes 18 and 19 which apply a light drag against the rotation of supply reels 12 and 14, respectively. A pressure pad 20 forces tapes 10 and 11 into face-to-face contact across the entire length of magnetic head 21. The pressure exerted by pressure pad 20 is sufficient to force the magnetic coatings of the master and copy tapes into intimate contact and with sufficient pressure that no relative slippage between the tapes occurs. The copy tape 11 is shown adjacent head 21 and master tape 10 is in face-to-face contact therewith. In practice, the opposite arrangement of master tape 10 adjacent the head is equally efficient such that the arrangement picked is merely an arbitrary choice.

Current for the magnetic head 21 is supplied by a power source 22 and wires 23 and 24. The current thus provided creates magnetic fields, as will be explained hereinafter, which transfer the prerecorded data from master tape 10 to copy tape 11. The paths for tapes 10 and 11 are arranged such that the tapes are separated immediately upon leaving the magnetic head 21. This immediate separation of the tapes prevents the tendency of the magnetic pattern on the master tape 10 to erase the copy pattern duplicated on copy tape 11 when the tapes are not under the influence of the transfer field.

A speed control comprising a capstan 25, pinch roller 26 and a motor 27 may be utilized to drive the tapes past the transfer head 21 at a predetermined speed. However, while this is required in all other systems, it is not necessary with the present apparatus due to the speed independence of the system. As will be explained hereinafter, the effectiveness of the transfer of prerecorded patterns from master magnetic tape 10 to copy tape 11 remains essentially uniform at all speeds of movement of tapes 10 and 11 thereacross. The sole limiting factor comprises the friction developed between the tapes and head 21 and pressure pad 20 such that excessive heat may be developed at extremely high speeds, altering the characteristics of the tapes.

To make the system operate at extremely high speeds, an air bearing system may be employed to force the tapes together and maintain a thin air cushion between the copy tape 11 and the head 21. This will substantially reduce the friction between the tape and head 21, allowing extremely high speeds to be reached.

The prior art has utilized various systems to accomplish the transfer of data from the master magnetic tape 10 to copy tape 11. As stated previously, the system most generally utilized by the prior art is essentially that described in FIG. 2 wherein the head 21 comprises an A.C. bias head having a single, narrow magnetic gap extending across the widths of the tapes. Due to the physical size of such magnetic heads, the frequency provided by an A.C. signal power source is severely limited without special and complex equipment. Even so, driving the head at a high frequency and still controlling the power such that the amplitude of the magnetic field is limited precisely to that which will effect an optimum transfer and yet not erase the master recording is a severe problem.

In view of the prior art frequency limitation, the speed at which the tapes can be moved through the prior art alternating field is also limited. This is because each element of contact area between the master and copy tapes must be cycled through several cycles of the alternating magnetic field for optimum transfer to take place.

The subject invention avoids these problems by employing a multiple gap D.C. bias head 21 to effect the transfer of data from the master tape 10 to the copy tape 11.

Figure 3:
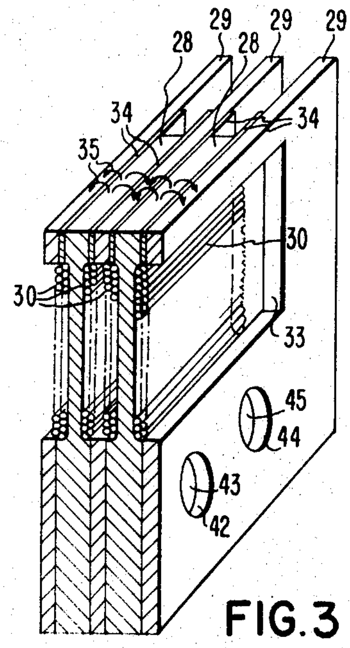
FIG. 3 comprises a cutaway view of the interior elements of the magnetic head of FIG. 1.

The multiple gap D.C. head of the present invention is shown in detail in FIGS. 1 and 3. This head provides efficient transfers that are independent of the transfer speed used.

The multiple gap D.C. head 21 provides a series of alternating magnetic poles, each separated by a small gap. Thus, each incremental portion of the master and copy tapes is drawn through lines of magnetic flux first proceeding in one direction, and then another. In this manner, the tapes experience a series of flux changes similar to that experienced with an A.C. head. However, no alternating source drives the head 21; the magnetic poles may be established by permanent magnets or, as shown here, by a D.C. current source 22.

Magnetic poles are created in head 21 by alternate pole pieces 28 and 29. Pole pieces 28 comprise a magnetically permeable iron material and are each wound with a fine wire 30, extending completely therearound, for a substantial number of turns. The direction of winding and the number of turns in each such coil 30 is identical for all pole pieces 28. One end of each coil is connected to a separate terminal 31, and the other end of each coil is connected to a separate terminal 32. Each coil is thus individually connected to a pair of terminals separate from the terminals for the other coils. In the embodiment presently being described, each of the terminals 31 is connected in common to wire 23 from current source 22 and each of the terminals 32 is connected in common to wire 24 from current source 22.

Energization of the coils 30 by current source 22 provides an emanating magnetic flux from pole pieces 28. For transfer of data across the full width of the tapes, the pole pieces are therefore at least as wide as the copy and master tapes.

The return path for the magnetic flux is provided by pole pieces 29. These pole pieces comprise iron sheet material cut essentially as shown. The cutout rectangle formed by surfaces 33 provides space for the coils 30 of pole pieces 28 such that the coils will not contact pole pieces 29.

Gaps between pole pieces 28 and pole pieces 29 at the surface of transfer head 21 are provided by means of brass shims 34. The shims are constructed to be of a thickness determined most desirable for effective transfer of the particular signal prerecorded on master magnetic tape 10.

The brass shims do not conduct magnetic flux; hence, substantial lines of magnetic flux are established across the gap above the surface of the head, in accordance with normal practice. These lines of flux are shown by arrows 35. The magnetic flux thus is transmitted from each core 28 across the gaps to pole pieces 29 on either side of the core 28. The gaps 34 and pole pieces 28 and 29 are arranged such that the lines of magnetic flux 35 are primarily horizontal at the point of contact between tapes 10 and 11. It appears that such an arrangement provides optimum transfer characteristics.

The magnetic flux is then transmitted by each pole piece 29 around the ends thereof to its base, where it is in contact with core 28, such that the magnetic flux is conducted back into the base of core 28.

The pole pieces and shims are assembled as shown and placed between head pieces 36 and 37. Screws 38–41 are then inserted in alternating directions through the head pieces and through holes 42–45 of the pole pieces 29 and 28 and threaded into the opposite head piece 37 or 36.

The head pieces are designed to have cutaway portions 46 and 47 adjacent most of the surface of the pole pieces and to have slightly protruding tips 48 and 49 to transmit the compression force therebetween to the sandwich of pole pieces 28 and 29 and shims 34 when screws 38–41 are tightened. This provides a firm, smooth surface along head 21 with no gaps into which foreign material may accumulate. To assure that the resultant surface is smooth to thereby reduce the friction thereof against the backing of tape 11, the resultant surface may be highly polished.

A mounting plate 50 of an insulating material, such as Bakelite, is provided for mounting the terminals 31 and 32 thereon.

Figure 4:
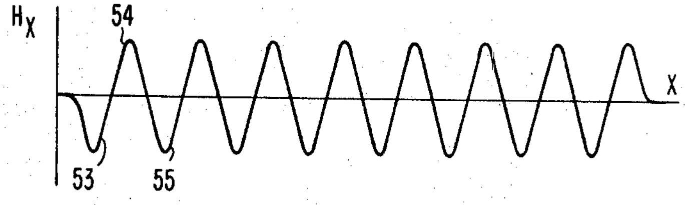
FIG. 4 is a graphical representation of a magnetic field encountered by an incremental portion of the magnetic tapes as they are drawn across a portion of the magnetic head of FIG. 1.

With the multiple gap D.C. head assembled as shown in FIG. 1, sixteen gaps of alternating polarity of magnetic flux are provided. FIG. 4 illustrates the horizontal magnetic flux presented as an incremental portion of the contact area between magnetic tapes 10 and 11 by the head 21 as this incremental portion is drawn across the head. For convenience, the horizontal movement is described as the X direction proceeding from left to right in FIGS. 1–3. The movement of the tapes through the field is shown generally by arrows 51 and 52. In FIG. 4, the horizontal (X) displacement of the incremental portion comprises the axis of abscissas and the amplitude of magnetic flux in the X direction ($H_X$) comprises the axis of ordinates.

As shown by FIG. 4*a*, as an incremental portion of the contact area between tapes 10 and 11 proceeds in the X direction the amplitude of magnetic flux ($H_X$) to which the tapes are submitted reaches a negative maximum 53 at the first gap. This indicates that at that point the magnetic flux is flowing from the first magnetic core 28 against the direcion of motion of the tapes to the first pole piece 29. As the incremental portion of the contact area is moved further to the right, the magnetic flux in the minus X direction diminishes and goes to zero, and the magnetic flux in the plus X direction increases and reaches a peak 54. Then, as the tape proceeds in the X direction, the magnetic flux in the X direction diminishes and goes to zero, and the magnetic flux in the minus X direction increases until a peak 55 is reached.

Since sixteen gaps, as shown by brass shims 34, are provided between pole pieces 28 and 29, the incremental portion of each tape is subjected to sixteen peaks of magnetic flux of alternating potential. Another way of stating the same fact is that each incremental portion of magnetic tape is subjected to fifteen flux reversals as it is drawn across transfer head 21.

In this manner, the master and copy tapes experience the same number of flux reversals regardless of the speed at which the tapes are drawn across the transfer head 21.

It has been found that in some instances, it is desirable to shape the amplitude of the bias field such that the first flux field encountered is of relatively low amplitude, and the amplitudes of the following flux fields gradually increase to a peak value and then the peaks of the fields gradually diminish to a low value at the final field.

Accordingly, in an alternative embodiment, the current source 22 is altered to provide currents at various terminals thereof different values. A cable 24 is then substituted for the wire previously connected to the current source. The cable comprises eight wires which are connected at one end to various terminals of the current source 22. The other ends of the wires comprising cable 24 are connected to the various terminals 32 such that the coils 30 at the extreme ends of the transfer head 21 receive the lowest amount of current, the coils adjacent the end coils receive the next lowest amount of current, etc., and the center coils receive the greatest amount of current.

Figure 5:
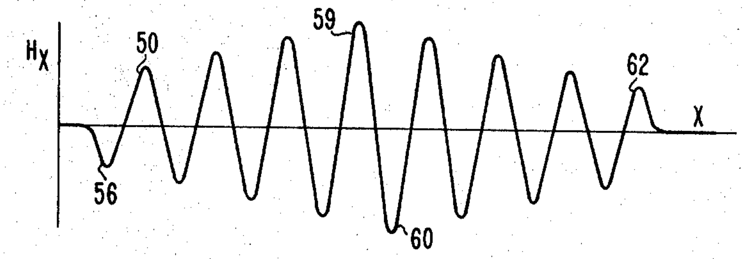
FIG. 5 is a graphical representation of the magnetic field encountered by an incremental portion of magnetic tape as it is drawn across a magnetic head of FIG. 1 with an alternative energization thereof.

The field encountered by an incremental portion of the contact area between the magnetic tapes 10 and 11 when moved across transfer head 21 is represented in FIG. 5. The graphical representation of FIG. 5 is similar to that of FIG. 4 in that the horizontal (X) displacement of the incremental portion comprises the axis of abscissas and the amplitude of magnetic flux in the X direction ($H_X$) comprises the axis of ordinates.

As the incremental portion of the contact area between the tapes moves in the X direction, it first encounters a peak 56 of magnetic flux of low absolute value, then encounters a peak of magnetic flux in the opposite direction 57 of slightly higher absolute amplitude, then encounters a peak 58 of magnetic flux in the first direction of even higher amplitude until peaks 59 and 60 of opposite polarity but equal amplitude are reached. These peaks comprise the highest absolute ampltiude of magnetic flux so that each subsequently encountered peak, such as peak 61, is of diminishing absolute amplitude until the final peak 62 is encountered of lowest absolute amplitude. Thus, the flux reversals encountered by the tapes are of low, but increasing intensity until a peak is reached and then the flux reversals are of steadily diminishing intensity.

The transfer of recorded information from the master tape 10 to the copy tape 11 has been found to be most effective when this field is employed. In the event fields of other shapes may be desired, the currents provided to the various coils may accordingly be made by proper adjustment of current source 22.

Figure 6:
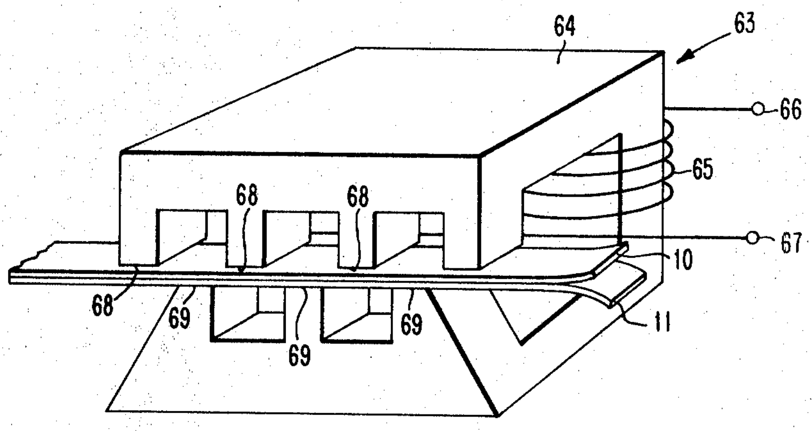
FIG. 6 is a schematic view of an alternative magnetic transfer head constructed in accordance with the present invention.

An alternative embodiment to the magnetic transfer head 21 is shown in FIG. 6.

The magnetic transfer head 63 shown in FIG. 6 is to be situated at an identical position to that of transfer head 21 in FIG. 2.

Magnetic transfer head 63 comprises a single block 64 of magnetically permeable material which is suitably cast or machined. A single coil 65 is wound around one arm of the block 64 and ends in terminals 66 and 67. These terminals are connected, respectively, to wires 24 and 23 of FIG. 2 for connection to current source 22.

The block 64 is of general horseshoe shape, ending in pole faces 68 and 69. The poles are arranged in alternating fashion such that a small horizontal gap exists between the poles 68 and 69. Likewise, a small vertical gap exists between the planes formed by the bottom faces of poles 68 and the top faces of poles 69. The master magnetic tape 10 and the copy tape 11 are then transported by the apparatus of FIG. 2 longitudinally through the vertical gap between pole 68 and 69.

Energization of coil 65 causes the poles 68 and 69 to be of opposite polarity, causing flux to be transmitted between the poles. Due to the slight horizontal gap, as well as the vertical gap, therebetween, the flux established at such gaps is of alternating horizontal polarity and appears to an incremental portion of the contact area between tapes 10 and 11 substantially the same as obtained with magnetic transfer head 21 and shown in FIG. 4.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. Magnetic duplicating apparatus for transferring a magnetic pattern from a master magnetic medium to a magnetizable copy magnetic medium of the type comprising means for juxtaposing said master and copy media and moving the same within a magnetic transfer field, and wherein the transfer field is established by a multiple-gap magnetic head comprising a multiple of magnetic flux issuing pole pieces each having one elongated surface constituting a pole face and an electric coil wound about said pole piece with the longitudinal axis substantially normal to said pole face, said flux issuing pole pieces being arranged parallel to each other, a multiple of magnetic flux returning pole pieces having one elongated surface constituting a pole face, said flux returning pole pieces being interposed between two flux issuing pole pieces with narrow gaps between adjacent pole faces and electromagnetic connection between the pole pieces remote from said gaps,
said pole pieces being arranged with all of said pole faces defining a common plane, and
means for passing direct current through all of said electric coils,
thereby to alternate magnetic polarity on succeeding pole faces a predetermined number of times for each pattern transferred regardless of the speed of movement of said media relative to said magnetic head.

2. Magnetic duplicating apparatus as defined in claim 1 and wherein,
said flux returning pole pieces are cut away for accommodating said electric coils on the adjacent flux issuing pole pieces,
thereby rendering a more compact structure.

3. Magnetic duplicating apparatus as defined in claim 1 and wherein
graded electric current is passed through at least some of said electric coils.

4. Magnetic duplicating apparatus as defined in claim 1 and wherein
the number of turns of said electric coils is graded for at least some of said coils.

5. Magnetic duplicating apparatus as defined in claim 1 and wherein
non-magnetic shim stock is interposed in said gaps.

6. Magnetic duplicating apparatus as defined in claim 5 and wherein
said pole pieces and said shims are clamped between two head pieces forming terminal flux returning pieces.

7. Magnetic duplicating apparatus as defined in claim 6 and wherein
said head pieces are recessed for accommodating the coil winding on the adjacent flux issuing pole piece.

8. Magnetic duplicating apparatus for transferring a magnetic pattern from a master magnetic medium to a magnetizable copy magnetic medium of the type comprising means for juxtaposing said master and copy media and moving the same within a magnetic transfer field, and wherein the transfer field is established by
a multiple-gap magnetic head comprising
a plurality of magnetic pole piece elements having elongated surfaces constituting pole faces of one polarity lying in a common plane and generally parallel to each other and spaced apart,
a plurality of magnetic pole piece elements having elongated surfaces constituting pole faces of opposite polarity lying in another common plane and generally parallel to each other and spaced apart,
said pole faces in said common planes being separated by a distance accommodating said media moving relative to said pole piece elements and between the pole faces of opposing polarity,
said pole piece elements of one polarity being staggered with respect to said pole piece elements of said other polarity along the lengths of said media and the lengthwise dimensions of said pole faces along the webs of said media extending substantially between the adjacent edges of two adjacent pole faces of opposite polarity thereby for establishing the flux translating magnetic gaps through the juxtaposed media,
magnetic coupling elements from said pole piece elements at points removed from said pole faces on one side of said media around to said pole piece elements on the other side of said media at points removed from said pole faces,
an electric conductor wound to encompass said elements at points between said pole faces and removed from the gaps therebetween, and
means for passing direct current through said electric conductor,
thereby to establish alternate magnetic polarity on succeeding pole faces on opposite sides along said media.

9. Magnetic duplicating apparatus for transferring a magnetic pattern from a master magnetic medium to a magnetizable copy magnetic medium of the type comprising means for juxtaposing said master and copy media and moving the same within a magnetic transfer field, and wherein the transfer field is established by
a multiple-gap magnetic head comprising
a multiple of permanent magnetic flux issuing pole pieces each having
one elongated surface constituting a pole face and
said flux issuing pole pieces being arranged parallel to each other and in the same polarity,
a multiple of magnetic flux returning pole pieces having
one elongated surface constituting a pole face,
said flux returning pole pieces being interposed between two flux issuing pole pieces with narrow gaps between adjacent pole faces and electromagnetic connection between the pole pieces remote from said gaps,
said pole pieces being arranged with all of said pole faces defining a common plane, and
thereby to establish alternate magnetic polarity on succeeding pole faces.

10. Magnetic duplicating apparatus as defined in claim 9 and wherein
at least a portion of said permanent magnetic flux issuing pole pieces are graded in the direction of movement of said media.

References Cited

UNITED STATES PATENTS

| | | | |
|---|---|---|---|
| 2,594,934 | 4/1952 | Kornei | 179—100.2 |
| 2,738,383 | 3/1956 | Herr et al. | 179—100.2 |
| 2,743,320 | 4/1956 | Daniels et al. | 179—100.2 |
| 2,784,259 | 3/1957 | Camras | 179—100.2 |

FOREIGN PATENTS

| | | |
|---|---|---|
| 747,361 | 9/1944 | Germany. |

BERNARD KONICK, Primary Examiner
R. S. TUPPER, Assistant Examiner